United States Patent Office 3,507,513
Patented Apr. 21, 1970

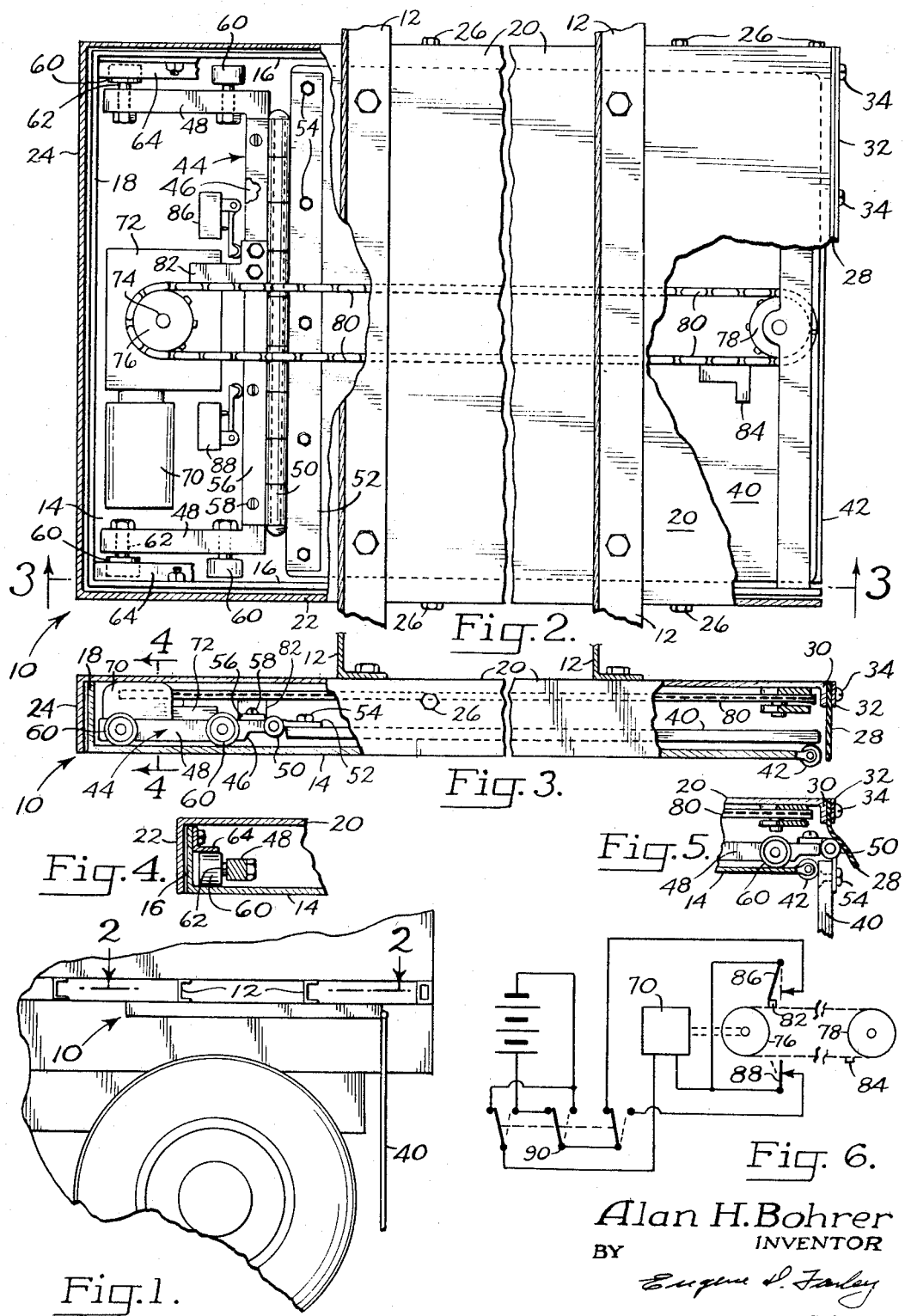

3,507,513
RETRACTABLE MUD FLAP
Alan H. Bohrer, 2041 N. Kilpatrick,
Portland, Oreg. 97217
Filed Jan. 8, 1968, Ser. No. 696,316
Int. Cl. B62d 25/18
U.S. Cl. 280—154.5
6 Claims

ABSTRACT OF THE DISCLOSURE

A retractable mud flap for trucks and other wheeled vehicles comprises a case having an open end and means for mounting on the underside of the vehicle. A carriage is mounted for reciprocating movement within the case. A mud flap is connected to the carriage. A reversible drive operates in a first direction to extend the mud flap into operative position and in a second direction to retract the mud flap within the case.

---

This invention relates to mud flaps for wheeled vehicles. It pertains particularly to retractable mud flaps which may be extended into working position and retracted into rest position when desired by the operator.

The operators of dump trucks and like vehicles are faced with a problem in that State laws require the trucks to be equipped with mud flaps extending downwardly behind the rear wheels a stated distance above the ground. However, when the dump truck then is used to deliver asphalt to an asphalt spreader, the rolls of the latter tear the flaps off as the truck feeds the asphalt to the spreader. Similarly, when the truck is used to stockpile asphalt or gravel, the load tends to dump on the flaps when the truck is in dumping position, tearing off the flaps.

The operator of the truck accordingly is faced with a dilemma which is difficult of solution. To comply with the law, he must equip the truck with mud flaps. However, when the truck so equipped is applied to various commonplace uses, the mud flaps are torn off. The result is a substantial and continuing loss to the operator.

It accordingly is the general purpose of the present invention to provide for dump trucks and other vehicles a retractable mud flap which may be extended to a working position when the truck is in transit, but which may be retracted to an inoperative but safe position when the truck is dumping its load.

It is a further object of the present invention to provide a retractable mud flap which is easily installed on truck bodies of various design without substantial modification thereof, which is rugged and foolproof in its operation, which is subject to precise and automatic control, and which is sealed against access of dirt to its operating mechanism.

The manner in which the foregoing and other objects of this invention are accomplished will be apparent from the accompanying specification and claims considered together with the drawings, wherein:

FIG. 1 is a fragmentary view of the rear end of a truck illustrating the manner of mounting the retractable mud flap of the invention;

FIG. 2 is a plan view of the mud flap looking in the direction of the arrows 2—2 of FIG. 1;

FIG. 3 is a longitudinal sectional view taken along line 3—3 of FIG. 2;

FIGS. 4 and 5 are detail sectional views taken along lines 4—4 and 5—5, respectively, of FIG. 3; and FIG. 6 is a schematic diagram illustrating an electric drive and control unit for the mud flap.

In essence the retractable mud flap of my invention comprises a case having an open end and means for mounting the case substantially horizontally on the underside of a vehicle, above a wheel thereof, with the open end of the case disposed rearwardly in operative relation to the wheel.

A carriage is mounted for reciprocating movement within the case. A substantially horizontal mud flap is connected to the carriage. A reversible drive is connected to the carriage for reciprocating it between a retracted position wherein the mud flap lies within the case and an advanced or extended position wherein the mud flap lies in working position behind the wheel. Accordingly, at the will of the operator, the mud flap may be employed while the truck is in transit to comply with the requirements of the law. However, it may be retracted where it is safe from damage when the truck is dumping its load.

Considering the foregoing in greater detail and with particular reference to the drawings:

As shown in the drawings, the retractable mud flap of my invention includes a case 10 which may be bolted or otherwise secured to brackets 12, horizontally, on the underside of the truck in operative relation with respect to a rear wheel thereof.

As shown in FIGS. 2 and 3, the case is in two nesting parts. The lower part comprises a bottom 14 sufficiently wide and long to house the mud flap and the associated mechanism. It also includes integral parallel side walls 16 and an integral front wall 18.

The cooperating upper portion of the case comprises a top 20, a pair of parallel side walls 22 and a front wall 24, all integral with top piece 20.

The components of the upper member are sufficiently large so that the lower member will nest within the upper member.

The lower and upper members of the case are demountably interconnected by means of screws 26. The open rear end of the case is sealed off by means of a flexible sealing strip 28 which may be fabricated of rubber, plastic, or other suitable tough pliable material. The upper margin of seal strip 28 is connected to a downwardly extending flange 30 by means of a clamp strip 32 and cooperating screws 34.

Mounted within the case thus provided is a mud flap 40. This essential component of the assembly may be fabricated from a heavy sheet of natural or synthetic rubber, plastic, impregnated fabric, or other material. It is sufficiently long to extend the required distance behind the truck wheel when lowered to its operative position.

The rear end of the mud flap is supported and guided on rolls 42 rotatably mounted on bottom piece 14 of the case.

The forward end of mud flap 40 is connected to a carriage by means of which the mud flap is extended and retracted.

The carriage, indicated generally at 44, comprises a U-shaped frame having a central segment 46, extending transversely of the case, and two side segments 48, directed rearwardly and extending longitudinally of the case.

Since to provide the necessary weight and durability mud flap 40 necessarily must be made of relatively thick, stiff material, a hinge connection is provided to secure it to the central section 46 of the carriage. The hinge may comprise a piano-type hinge 50, alternate knuckles of which are attached to a plate 52 secured by bolts 54 to the forward portion of mud flap 40. The remaining knuckles are attached to a plate 56 secured by means of bolts 58 to center section 46 of the carriage.

Carriage 44 is mounted for reciprocation within case 10 by means of rollers 60, the shafts 62 of which are fixed in carriage side pieces 48. The rollers in turn track in tracks 64 bolted to the inside faces of side wall 16 of the lower or inner case member.

Carriage 44 thus may be reciprocated between a retracted position, the position of FIGS. 2 and 3, wherein the mud flap lies completely within the case, and an extended or working position, the position of FIG. 1, wherein it lies entirely outside of the case and is hinged downwardly until it lies in proper relation to the truck wheel. Although various drives may be employed for accomplishing this reciprocation, preferred drive is illustrated in the drawings.

A reversible electric motor 70 drives a gear box 72, the shaft 74 of which mounts a sprocket 76. A cooperating idler sprocket 78 is mounted at the rearward end of the case, on top plate 20.

Sprockets 76, 78 lie in the same horizontal plane and mount a drive chain 80. The chain has connected to it at spaced, predetermined intervals a first lug 82 and a second lug 84. The lugs are arranged to operate normally closed, spring biased, limit switches 86, 88 respectively.

Lug 82 is bolted to central segment 46 of carriage 44. It provides the driving connection between the drive chain and the carriage. In addition, there is provided a three-way manual switch 90 located in the cab of the truck convenient to the operator.

The manner of operation of the herein described retractable mud flap is illustrated in the schematic circuit diagram of FIG. 6.

With the electric circuit in the condition of FIG. 6, mud flap 40 is in the retracted condition of FIGS. 2 and 3. When the operator wishes to extend the mud flap into the operative position of FIG. 1, he moves manual, three-way switch 90 to the dotted line position of FIG. 6. This closes the circuit including motor 70 and limit switch 88, thereby driving the motor in a forward direction and extending the mud flap until it is in its working position. When it is in this position, lug 84 contacts limit switch 88, opening the circuit and stopping the motor.

When the operator desires to retract the mud flap, he will move manual switch 90 to the full line position of FIG. 6. This will close a circuit through limit switch 86, which has been biased to its closed position upon removal of lug 82, and through the reverse windings of motor 78. The motor accordingly will drive chain 80 in the reverse position, retracting the mud flap. When the mud flap is fully retracted, lug 82 will contact limit switch 86, opening the circuit and arresting the drive.

It is to be understood that the forms of my invention herein shown and described are to be taken as illustrative examples of the same and that various changes in the shape, size and arrangement of parts may be resorted to without departing from the spirit of my invention.

Having thus described my invention, I claim:

1. A retractable mud flap for wheeled vehicles comprising:
    (a) a case having an open end,
    (b) means for mounting the case substantially horizontally on the underside of the vehicle above the wheel thereof, with the open end of the case disposed rearwardly in operative relation to the wheel,
    (c) carriage means mounted for reciprocating movement in the case and comprising a U-shaped body extending transversely across the case, and a plurality of wheels rotatably mounted on the side sections of the U-shaped body adjacent the sides of the case,
    (d) track means mounted on the inside faces of the case sides and receiving the wheels,
    (e) a mud flap lying horizontally within the case and connected to the central segment of the U-shaped body, and
    (f) drive means connected to the carriage for reciprocation between a retracted position wherein the mud flap lies within the case and an advanced position wherein the mud flap is extended outside the case and behind the wheel.

2. The retractable mud flap of claim 1 wherein the case comprises a bottom section comprising a bottom, two side walls and a back wall and a top section comprising a top, two side walls and a back wall, the bottom section being dimensioned for nesting within the top section, and securing means securing the two sections together to form a case having an open end.

3. The retractable mud flap of claim 1 including a flexible sealing strip and means for mounting the same across the open end of the case for sealing the case interior against the entry of dirt.

4. The retractable mud flap of claim 1 wherein the mud flap comprises a stiff, heavy piece of sheet material and including hinge means hinging the inner end of the piece to the carriage means.

5. The retractable mud flap of claim 1 wherein the drive means comprises an endless chain, sprocket means mounting the chain in a horizontal plane, connecting means connecting the chain to the carriage means, and reversible electric motor means connected to the sprocket means for driving the same in forward and reverse directions.

6. A retractable mud flap for wheeled vehicles comprising:
    (a) a case having an open end,
    (b) means for mounting the case substantially horizontally on the underside of the vehicle above the wheel thereof, with the open end of the case disposed rearwardly in operative relation to the wheel,
    (c) carriage means mounted for reciprocating movement in the case,
    (d) a mud flap lying horizontally within the case and connected to the carriage means, and
    (e) drive means connected to the carriage for reciprocation between a retracted position wherein the mud flap lies within the case and an advanced position wherein the mud flap is extended outside the case and behind the wheel, the drive means comprising
        (1) an endless chain,
        (2) sprocket means mounting the chain in a horizontal plane,
        (3) connecting means connecting the chain to the carriage means,
        (4) reversible electric motor means connected to the sprocket means for driving the same in forward and reverse directions, and
        (5) control means for controlling the electric motor means, the control means comprising a pair of limit switch contact means secured in predetermined advanced and retracted positions on the chain, and an electric circuit including the electric motor means, a pair of limit switches mounted within the case for contact by the limit switch contact means, and manual switch means operative to close the circuit and drive the motor in a first direction when the first limit switch is closed and operative to close the circuit and drive the motor in a second direction when the second limit switch is closed.

References Cited
UNITED STATES PATENTS

| | | |
|---|---|---|
| 2,721,760 | 10/1955 | Lapham et al. |
| 2,857,200 | 10/1958 | Hoppesch. |
| 3,006,487 | 10/1961 | Gelli _____ 214—83.24 |
| 3,195,920 | 7/1965 | Knisely et al. _____ 280—154.5 |
| 3,310,344 | 1/1967 | Beintum et al. _____ 298—1 |
| 3,361,477 | 1/1968 | Pitts _____ 214—83.24 |

LEO FRIAGLIA, Primary Examiner

L. J. PAPERNER, Assistant Examiner

U.S. Cl. X.R.

298—1